Patented Oct. 21, 1941

2,259,618

UNITED STATES PATENT OFFICE 2,259,618

INDIGOID DYE AND PROCESS OF MAKING THE SAME

John Elton Cole and Benjamin Franklin Skiles, Wilmington, Del., assignors to E. I. du Pont de Nemours & Company, Wilmington, Del., a corporation of Delaware No Drawing. Application December 7, 1938, Serial No. 244,353

14 Claims. (Cl. 260—322)

This invention concerns the manufacture of new indigoid dyes. More particularly, it relates to the production of dyes containing a thio-indigoid group which is substituted by oxy-alkoxy groups.

It is an object of this invention to provide novel colors of the indigoid series, which are useful in the dyeing and printing of textile fibers. Other and further objects of this invention will appear as the description proceeds.

The novel colors with which this invention is concerned are of an indigoid structure and may be represented generally by the formula

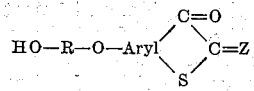

wherein Aryl designates an aryl nucleus of the benzene or naphthalene series, R represents an alkyl or hydroxy-alkyl radical having no more than 4 carbon atoms in its structure, while Z represents a component of the group which are capable of being condensed with a 3-oxy-thionaphthene radical to produce an indigoid compound; typical components falling within this group are the indoxyls, thioindoxyls and acenaphthene-quinones. When Z is a thioindoxyl radical it may carry further substituents of the type —O—R—OH, as above defined, or it may even carry a diethylene-glycol-oxy group, that is the grouping O—CH₂CH₂OCH₂CH₂OH, as obtainable by reacting with ethylene oxide upon a compound having a free OH group.

We have found that organic compounds answering the above general formula possess valuable properties as vat dyes for textile fabric especially cotton and artificial cellulosic fiber. Moreover, when used as printing colors, many of the compounds of the above series exhibit unusual superiority to various other related indigoid colors, as regards tinctorial strength, uniformity of print (freedom from specks and unevenness), and fastness of the resulting color to laundering and crocking. For instance, considering the symmetrical compound of the formula

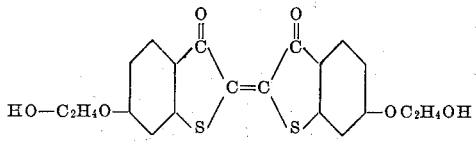

which may be named 6,6'-di(beta-hydroxy-alkoxy)-thioindigo, and which may be prepared as more fully described below, we find that even without resort to special printing assistants, such as glycerine, glycol or higher-alkyl-sodium sulfates, it gives very uniform prints of strong tinctorial value, good penetration and excellent fastness to laundering and crocking, and is much superior in these respects to 6,6'-diethoxy-thioindigo which obviously is very closely related to it in structure. The effect is particularly surprising when one observes that 6,6'-dihydroxythioindigo, which obviously is also closely related in structure, is alkali-soluble and therefore has practically no washing fastness at all.

Similar superior effects we have observed in a great many other compounds of the above novel series, regardless whether symmetrical or unsymmetrical, whether purely thioindigoid (two thionaphthene rings) or of the thionaphthene-indoxyl form, or of the thionaphthene-acenaphthene-quinone form. These properties, together with the desirable shades of the novel compounds, which are generally within the range of orange to red to violet, to blue and black render our novel series of colors a most valuable contribution to the practical arts of dyeing and printing.

The novel compounds of our invention may be prepared by several methods, and will give various sub-generic types of compounds, depending on the method employed; these may be summarized under the following headings:

1. Symmetrical thioindigoid compounds by oxidation of an oxy-thionaphthene containing in the aryl nucleus a hydroxy-alkoxy substituent of the general formula HO—R—O—, as above defined.

2. Unsymmetrical indigoid compounds by condensing in the usual manner (through the 2-anil form, the 2-keto form, or in any other convenient form) a 3-oxy-thionaphthene having a substituent of the type HO—R—O—, as above defined, in its aryl nucleus with an indigoid forming component such as a 3-oxy-thionaphthene, an indoxyl or an acenaphthene-quinone.

3. Symmetrical or unsymmetrical indigoid compounds by starting with a finished indigoid compound, symmetrical or not, having at least one thionaphthene component which carries in the aryl nucleus a free OH group. This OH group is then converted into the desired form HO—R—O— by subjecting the compound to alkylation by means of an alkylating agent which is adapted to replace the hydrogen atom of the OH group by a hydroxy-alkyl radical; in other words, an alkylene chlorhydrin or an alkylene oxide. An illustration of this process is the conversion of 6,6'-dihydroxy-thioindigo into the desired 6,6'-di(hydroxy-alkoxy) form by treatment with ethylene chlorhydrine or ethylene oxide.

4. Symmetrical or unsymmetrical indigoid compounds by starting with any of the products obtained in sections 1, 2 and 3 above, and subjecting these to customary chemical treatments whereby to replace part of its nuclear hydrogen by convenient simple, inert substituents such as halogen.

In the case of the procedure under section 3, further variation of the resulting compound may be effected by choosing the alkylating agent from among two types:

(a) If the alkylating agent is of the halohydrin type, that is one depending for its action on the splitting off of halogen, the substitution is simple, and generally the OH group of the color is etherified by a single hydroxy-alkyl group, thus:

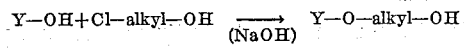

(b) If, however, the alkylating agent is an alkylene oxide, for instance ethylene-oxide, it is possible to introduce several OR groups in a chain into each OH group, due to the tendency of these reagents to polymerize, and the substitution where several OH groups are available will not necessarily be symmetrical. It is preferred, however, according to this invention, to work with a limited quantity of the alkylene oxide, so that at least one of the replaced OH groups will have the simple, monomeric form typified by O—CH₂CH₂OH.

As regards the substituted hydroxy-thionaphthenes, which are used as initial material in procedures 1 and 2 above, and which are particularly characterized by carrying the group HO—R—O— in their nucleus, these are themselves novel compounds and are more fully described and claimed in our copending application, Serial No. 244,354, of even date herewith (which issued January 14, 1941, as U. S. Patent No. 2,228,753). Briefly speaking these compounds may be synthesized by one of two principal methods:

Either one starts with a 3-hydroxy-thionaphthene which has a further hydroxy group in the aryl nucleus, and reacts upon the same with a hydroxy-alkylating agent, such as ethylene chlorhydrin or ethylene oxide according to procedures a and b above indicated;

Or one starts with the desired ortho-aminoaryl-thioglycollic-acid-lactam, which carries in the aryl nucleus a hydroxy-alkoxy substituent of the desired type and in the desired position, and one subjects this lactam to the well known series of steps requisite for converting a lactam of this type into a hydroxy-thio-naphthene, namely: alkali-treatment to open the lactam ring, diazotization and further treatment with sodiumcuprous cyanide to convert it into an orthocyano-aryl-thioglycollic-acid-sodium-salt; and further treatment of the latter with caustic soda and finally with sulfuric acid, in known manner.

Without limiting our invention to any particular procedure, the following examples are given to illustrate our preferred mode of operation. Parts mentioned are by weight.

Example 1.—Three parts of 3-hydroxy-6-ethanoloxy-thio-naphthene (copending application Ser. No. 244,354, of even date herewith, now Patent 2,228,753; Ex. 1) were dissolved in a caustic solution containing 4 parts of sodium hydroxide in 166 parts of water. The solution was warmed to 80° C., 8 parts of a 45% solution of sodium polysulfide (Na₂S₄.₅) was added, and the mass was heated at 100° C. for one hour. An orange scarlet product separated out, which presumably constituted 6,6'-di(beta-ethanoloxy)-thioindigo, of the formula given above.

After filtering and washing with water, a color paste was obtained, which dissolved in concentrated sulfuric acid to a greenish-blue solution, and formed with alkaline-hydrosulfite a yellow vat.

0.3 part of anthraquinone-beta-sodium sulfonate were mixed with the above paste and the latter was then incorporated into a thickening and reducing paste to form a printing paste in the usual manner. When printed on cotton, lustrous or delustered rayon, and saponified acetate silk, and developed in the usual manner, it gave scarlet prints which exhibited excellent fastness to light, chlorine, washing, and dry crocking. Exceptionally level prints were obtained on the synthetic fibers.

Example 2.—Ten parts of 6:6'-dihydroxythioindigo (Ber. 49, 955; 1916) were dissolved in 2000 parts of water and 4 parts of a 30% sodium hydroxide solution. Eight parts of a 40% ethylene-chloro-hydrine solution were added, and the solution was refluxed for 3 hours. The mass was then made alkaline to Clayton Yellow, and the alkali-insoluble product was removed by filtration and washed with water. The product, 6:6'-diethanoloxy-thioindigo was identical in properties with that prepared in Example 1.

Example 3.—Ten parts of 6:6'-dihydroxythioindigo, 100 parts of ortho-dichloro-benzene, 4 parts of ethylene oxide, and 1 part of piperidine were heated at 170° C. for 10 hours. The portion of the product which was insoluble in orthodichloro-benzene was filtered off and purified by solution in an alkaline sodium hydrosulfite bath. The color was then isolated from the vat by air oxidation.

The product dissolves in sulfuric acid to give a violet solution, and vats to a yellow vat, which dyes cotton, rayon and saponified acetate silk in scarlet shades having excellent fastness to light, chlorine, washing, and crocking. It gives exceptionally level prints on the synthetic fibers. Analytical data indicate that the product has as its probable formula:

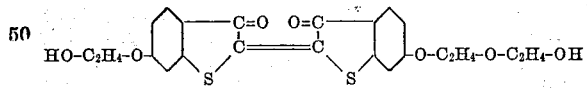

which may be named 6'-(diethylene-glycol-oxy)-6-(beta-hydroxyethoxy)-thioindigo.

Example 4.—Seven parts of the p-dimethylamino-anil of 6-ethanoloxy-3-hydroxy-thionaphthene (see Ex. 1 above) were dissolved in 200 parts of glacial acetic acid and added to a solution of 4 parts of 4:5-pheno-3-hydroxy thionaphthene dissolved in 200 parts of glacial acetic acid. This solution was refluxed for 3 hours, cooled to 60° C. and the dyestuff was filtered off and washed first with glacial acetic acid and then with water. The product, which probably corresponds to the formula

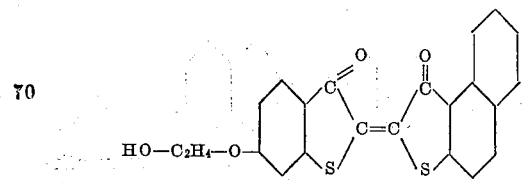

dissolves in concentrated sulfuric acid to give a blue solution, and vats to a yellow vat, which dyes cotton and rayon reddish brown shades of good fastness to light, chlorine, and washing.

*Example 5.*—Nine parts of acenaphthene-quinone were added to a solution of 10 parts of 6-ethanoloxy-3-hydroxy-thionaphthene dissolved in 500 parts of a 5% sodium hydroxide solution. This mixture was stirred and refluxed for 2 hours. After cooling to 40° C. the dyestuff was filtered off and washed first with alcohol and then with water. The color, which most probably corresponds to the formula

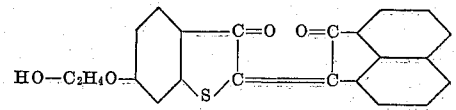

dissolves in concentrated sulfuric acid with an olive coloration and gives a red-brown vat, from which cotton and regenerated cellulose are dyed in golden-orange shades of good fastness properties.

*Example 6.*—Four parts of 4-methyl-6-chloro-3-hydroxythionaphthene and 7 parts of the p-dimethylamino anil of 6-ethanoloxy-3-hydroxy thionaphthene were dissolved in 400 parts of glacial acetic acid, and the resulting solution was refluxed for 3 hours. After cooling to 60° C. the dyestuff, which probably corresponded to the formula

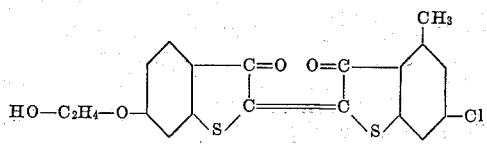

was filtered off, washed with glacial acetic acid, and finally with water.

The resulting paste was mixed with 2 parts of anthraquinone-beta-sodium sulfonate. When printed on cotton, lustrous or delustered rayon, and saponified acetate silk, scarlet shades of excellent fastness to chlorine, light, and washing were obtained. Unusually level prints were obtained on the synthetic fibers.

*Example 7.*—To a solution of 4 parts of 6-ethoxy-3-hydroxythionaphthene in 200 parts of glacial acetic acid, 7 parts of the p-dimethylamino anil of 6-ethanoloxy-3-hydroxythionaphthene, dissolved in 200 parts of glacial acetic acid, were added. The mixture was heated and stirred under reflux for several hours, cooled to 60° C. and the color of the probable constitution

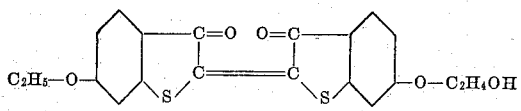

was filtered off, washed with glacial acetic acid, and finally with water.

The resulting paste was mixed with 1.0 part of anthraquinone beta-sodium-sulfonate. When printed on cotton and various artificial fibers, such as lustrous or delustered rayon and saponified acetate silk, reddish-orange shades of good tinctorial power and brilliancy were obtained. The color showed good fastness to washing, power laundry, chlorine, and light. Prints of unusual levelness were obtained upon the synthetic fibers.

*Example 8.*—Three parts of the p-dimethyl-anil of 5,7-dimethyl-3-hydroxy-thionaphthene were dissolved in 100 parts of glacial acetic acid, and a solution of 2 parts of 6-ethanoloxy-3-hydroxy-thionaphthene in 100 parts of glacial acetic acid was added. The mass was refluxed for 3 hours, cooled to 60° C., and the dyestuff, of the probable formula

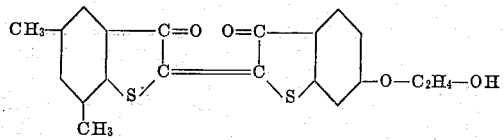

was filtered off, washed with glacial acetic acid and finally with water. The product gives a red-yellow vat, from which cotton and rayon are dyed bluish-red shades of good fastness properties.

*Example 9.*—Three parts of 3-hydroxy-6-(beta-hydroxy-propyloxy)-thionaphthene (Ex. 3 of copending application Ser. No. 244,354, now Patent 2,228,753) were dissolved in a caustic solution containing 4 parts of sodium hydroxide in 166 parts of water. The solution was warmed to 80° C.; 8 parts of a 45% solution of sodium polysulfide ($Na_2S_{4.5}$) were added; and the mass was heated at 100° C. for 1 hour. The 6:6'-di-(beta-hydroxy-propyloxy) thioindigo which precipitated was filtered off and washed with water. The probable formula for this color is

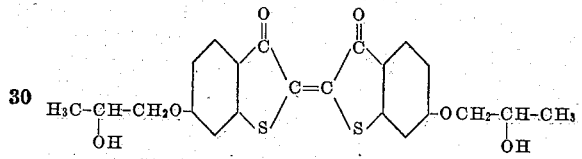

It vats to give a reddish-brown vat which dyes cotton, rayon and saponified acetate silk in bluish-scarlet shades. It gives unusually level prints on lustrous and delustered rayon, and on saponified acetate silk.

*Example 10.*—A solution containing 4 parts of sodium hydroxide and 3 parts of 3-hydroxy-6-(hydroxy-isobutyloxy)-thionaphthene (Ex. 4 of copending application Ser. No. 244,354, now Patent 2,228,753) in 166 parts of water was warmed to 80° C., and 8 parts of a 45% solution of sodium polysulfide ($Na_2S_{4.5}$) were added. After heating at 95° C. for 1 hour the 6:6'-di-(hydroxy-isobutyloxy)-thioindigo was filtered off and washed with water. Its probable formula is

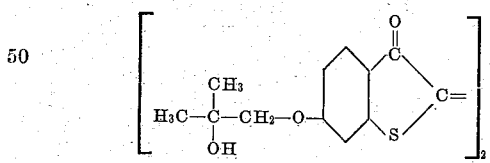

It dissolves in sulfuric acid to give a purple solution. It prints cotton, lustrous or delustered rayon, and saponified acetate silk scarlet shades of good fastness properties. The prints on the synthetic fibers are unusually level.

*Example 11.*—A solution containing 4 parts of sodium hydroxide and 3 parts of 3-hydroxy-6-(beta,gamma-dihydroxy-propyloxy)-thionaphthene in 166 parts of water was warmed to 80° C., and 8 parts of a 45% solution of sodium polysulfide ($Na_2S_{4.5}$) were added. After heating at 95° C. for 1 hour, the 6:6'-di(beta,gamma-dihydroxypropyloxy)-thioindigo was filtered off and washed with water. Its probable formula is

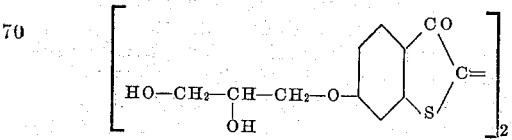

0.3 part of anthraquinone-beta-sodium-sulfonate was mixed with the above paste, which then printed cotton, lustrous or delustered rayon, and saponified acetate silk in bluish-scarlet shades of good fastness to light and chlorine. The prints on the synthetic fibers were unusually level.

*Example 12.*—Five parts of 6:6'-diethanoloxy-thioindigo were suspended in 100 parts of nitrobenzene, and 7.7 parts of bromine were added. This mixture was refluxed for 5 hours; 400 parts of carbon-tetrachloride were added, and the mixture was cooled to 20° C. The dyestuff, having as its probable formula

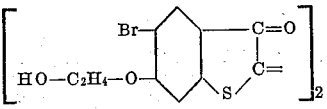

was filtered off, vatted, and oxidized by aeration. After filtering and washing with water, 0.5 part of anthraquinone-beta-sodium-sulfonate was mixed with the paste, which was then printed on cotton, lustrous or delustered rayon, and saponified acetate silk to give pink shades.

*Example 13.*—Nine parts of 5,7-dibromoisatin, 8 parts of phosphorous pentachloride, and 90 parts of ortho-dichlorobenzene were heated at 80 to 90° C. for 20 minutes. Then a solution containing 6 parts of 6-ethanoloxy-3-hydroxy-thionaphthene, dissolved in 200 parts of ortho-dichlorobenzene, was added, and the mixture was heated at 90° C. for 1 hour. The precipitated color was filtered off and washed with hot alcohol and hot dilute caustic. It has the probable formula

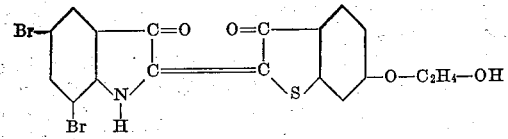

The product dissolves in sulfuric acid to give a blue solution and vats to a yellow vat which dyes cotton and rayon violet shades.

If in lieu of the 3-hydroxy-6-ethanoloxy-thionaphthene employed in Example 1, there be employed a corresponding quantity of 6:7-dichloro-3-hydroxy-4-ethanoloxy-thionaphthene, 5-ethanoloxy-3-hydroxy-thionaphthene, 7-chloro-4-ethanoloxy-2,1-naphthoxy-thiophene, 5:6-benzo-7-ethanoloxy-thionaphthene, or 4:7-dimethyl-6-ethanoloxy-3-hydroxy-thionaphthene, the following symmetrical thioindigoes will be obtained respectively: 6,6',7,7'-tetra-chloro-4,4'-diethanoloxy-thioindigo, 5,5'-diethanoloxy-thioindigo, 7,7'-dichloro-4,4'-diethanoloxy-2,1,2',1'-dinaphtho-thioindigo, 5,6,5',6'-dibenzo-7,7'-diethanoloxy-thioindigo, or 4,7,4',7'-tetra-methyl-6,6'-diethanoloxy-thioindigo.

It will be understood that the details of procedure set forth in the above examples are not limitative, but may be varied widely within the skill of those engaged in this art. Thus the conditions for the oxidation of the hydroxy-thionaphthenes to the corresponding symmetrical colors are per se well known in the art. The oxidizing agents which may be used, to mention a few, are: oxygen (or air), polysulfides, peroxides such as sodium perborate, ferricyanides and numerous other oxidizing agents.

Likewise, the unsymmetrical colors can be prepared by condensation of the hydroxy-thionaphthenes, as such or in the form of their reactive 2-derivatives, for instance the 2-anil compounds, with indigoid components such as isatins, naphthisatins, indoxyls, thionaphthenequinones, hydroxy-thionaphthenes, acenaphthenequinones, 1-hydroxynaphthalenes, 1-hydroxy-anthrol, etc. The conditions for making unsymmetrical colors are also well known in the art, but generally speaking, these condensations are carried out in one of two general ways:

(1) In an inert, anhydrous medium which is usually slightly acidic; and (2) In an aqueous or alcoholic alkaline medium in which the condensation usually occurs in the beta position. Generally speaking, as is known in the art, the anhydrous methods give rise to faster colors, since under these conditions the condensation goes in the alpha position of the thionaphthene nucleus.

The conditions for treating the oxy-thio-indigoes with ethylene-oxide derivatives also lend themselves to wide ranges of conditions. Preferably, these condensations are carried out in an inert solvent with or without the customary catalysts such as pyridine, piperidine, diethylaniline, sodium hydroxide, hydrochloric acid, etc. Generally, the temperatures at which these condensations are carried out are below 200° C. They may be carried out under pressure, but it is possible to carry them out under ordinary atmospheric pressure.

As already indicated the quantity of ethylene oxide to be employed should be limited to less than the quantity which would introduce, on the average $2C_2H_4O$ units per OH group. But there should not be less than 1 mole per OH group, to insure that each of these adds on at least one $C_2H_4O$ unit. In lieu of ethylene oxide, propylene oxide or glycide may be employed.

Another possible way of making the oxy-alkoxy indigoids of this class, as already indicated, consists in alkylating the corresponding oxy-indigoid compound in alkaline aqueous solution with chlorhydrin compounds. When this method is used, the results are a little more clear-cut as to the nature and amount of substitution than when using ethylene oxide.

Generally speaking, it may be said that wherever alkoxy-thio-indigoes are known, the corresponding hydroxy-alkoxy-thio-indigoes may be made by one of the methods indicated above.

The practical advantages of our novel series of colors will by now be readily apparent. We have found that many of these colors give particularly bright scarlet shades of unusual fastness, especially with regard to crocking in heavy shades. This feature is of very great importance in the printing of heavy shades, especially on draperies, upholstery, etc. 6:6'-di-beta-hydroxy-ethoxy-thio-indigo, for example, gives super-shade scarlet, far superior in crocking fastness to any scarlet commercially available. Furthermore, these colors exhibit superior light fastness to the colors now available in this shade range.

Furthermore, as already mentioned, the colors of this invention in general are capable of being printed on textile fiber, giving very smooth, uniform results without resort to the expensive assistants which are now used to obtain uniform prints. The importance of this property will be appreciated when one considers the numerous patents issued within recent years on processes and special assistants for improving the printing qualities of vat dyestuffs. Among the numerous special assistants suggested for the above purpose may be mentioned: the higher alkyl-sodium-sulfates, the mono-alkyl-phthalates, the branched-chain, higher fatty-acid sodium-salts, glycerine, ethylene- and diethylene-glycol, thio-diglycol, Turkey red oil, and various other hydrotropic agents.

Nevertheless, the above discussion with regard to the superiority of these colors in the absence of assistants should not be taken to mean that such assistants cannot be used with them. Among the printing assistants which may satisfactorily be used may be mentioned: metallic salts, especially those of iron, copper and aluminum; soluble anthraquinone derivatives; and various hydrotropic agents such as glycerine, ethylene-glycol, ethanol-amines, mono-alkyl-phthalates, alcohol-sulfate esters, etc.

Our novel colors may be standardized in powder or paste form by any of the usual assistants and by any of the various known mechanical methods. They may also be reduced to their stable leuco-derivatives by reduction in the absence of excess alkali, and standardized in this form either as powders or pastes.

We are aware that suggestions have been made in the art for improving the dyeing qualities of various dyes by reacting said dyes with ethylene oxide or alkylene chlorhydrins whereby to replace exchangeable hydrogen atoms on said dyes by hydroxy-alkyl groups. However, in the actual disclosure relating to this proposal, the process has been applied specifically only to dyes having amino groups, and the quantity of ethylene oxide to be employed was there specified as sufficient to introduce at least two $C_2H_4O$ units into each reactive group in the dye. That the simple short-chain of type —$OCH_2CH_2OH$ would be sufficient to improve the penetrability and fastness of the color, has apparently not been known, especially as regards thioindigoid colors.

Furthermore, in the said art, the suggestion has been applied specifically only to anthraquinone and azo dyes, and the resulting colors were not used as vat colors, but rather as direct and mordant colors. Apparently it was not known that the resulting colors would be improved even if employed as vat colors. And certainly nothing was taught in the art in regard to the use of the resulting colors as printing colors.

That our invention is actually capable of improving the printing qualities of thioindigoid vat dyes is indeed very surprising, especially in view of the fact that the invention herein discussed does not improve their utility as dyeing colors. Thus, the novel compounds hereinabove described when used as a dye from the vat produce dyeings which are fugitive to soaping. When used in printing, however, they give prints of excellent soap fastness.

In the claims below the expressions "radical of an indigoid coupling component" and "coupling radical of a component adapted . . . to produce an indigoid compound" shall be understood as referring to the bivalent radical of such compounds as are recognized in the art as being capable of condensation with oxindole, 3-hydroxy-thionaphthene and similar intermediates to produce a dyestuff of the indigoid type, that is one capable of being applied to fabric by the vat process and characterized by possessing the grouping

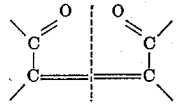

whereof the portions on each side of the dotted line are parts of respective cyclic radicals. This definition includes the coupling radicals of alpha-naphthols and alpha-anthrols, which compounds by tautomerization in situ are capable of furnishing the following coupling radicals:

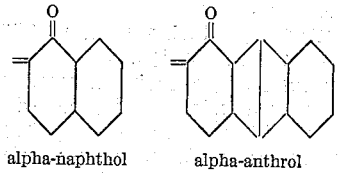

alpha-naphthol     alpha-anthrol

It will be noted further that isatin and indoxyl both give the same coupling radical

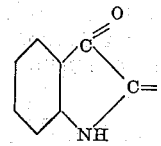

Therefore, where one is specifically named in a claim, the other one shall be understood as included by implication.

We claim:

1. A vat dyestuff of the indigoid series characterized structurally by possessing at least one 3-hydroxy-thionaphthene component which in turn possesses in the aryl nucleus at least one hydroxy-alkoxy group having not more than 4 carbon atoms in its structure, said dyestuff being further characterized by its adaptability to produce level prints on artificial cellulosic fabric substantially fast to crocking.

2. A vat coloring compound of the general formula

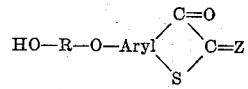

wherein Aryl designates an aryl nucleus having not more than 10 carbon atoms in its cyclic skeleton, Z represents the coupling radical of a component adapted to be condensed with a 3-hydroxy-thionaphthene radical to produce an indigoid compound; while R represents a radical of the group consisting of alkyl and hydroxy-alkyl radicals, having not more than 4 carbon atoms in their structure.

3. A vat compound of the general formula

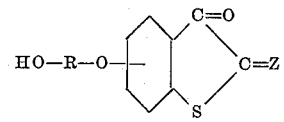

wherein Z is the radical of an indigoid coupling component, adapted to be condensed with a 3-hydroxy-thionaphthene radical, while R represents a radical of the group consisting of alkyl and hydroxy-alkyl radicals, having not more than 4 carbon atoms in their structure.

4. A thioindigoid coloring compound of the general formula

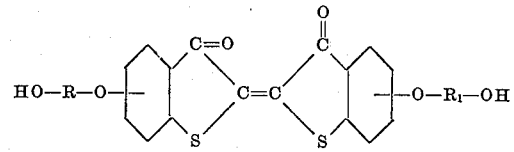

wherein R and $R_1$ represent aliphatic radicals selected from the group consisting of the alkyl, hydroxy-alkyl and dialkyl-ether radicals, at least one of the members R and $R_1$ being a simple, monomeric alkyl radical having not more than 4 carbon atoms in its structure.

5. As a new vat coloring matter, 6'-(diethylene-glycol-oxy) - 6 - (beta-hydroxy-ethoxy)-thioindigo.

6. As a new vat coloring matter, 6,6'-di(beta-hydroxy-ethoxy)-thioindigo.

7. The process of producing a vat dye coloring matter, which comprises subjecting to oxidation a 3-hydroxy-thionaphthene carrying in its nucleus a hydroxy-alkoxy group, whereby to form a symmetrical thioindigoid compound.

8. The process of producing a vat dye coloring matter, which comprises subjecting 3-hydroxy-6-beta-ethanoloxy-thio-naphthene to oxidation, whereby to produce a thioindigo compound.

9. A vat coloring compound of the general formula

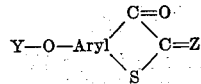

wherein Aryl designates an aryl nucleus having not more than 10 carbon atoms in its cyclic skeleton, Y represents an aliphatic radical having not more than 4 carbon atoms but at least one OH group, while Z represents the radical of an indigoid-coupling component selected from the group consisting of the isatins, naphthisatins, thionaphthene-quinones, hydroxy-thionaphthenes, pheno-hydroxy-thionaphthenes, acenaphthenequinones, α-naphthols and α-anthrols.

10. A vat coloring compound of the general formula

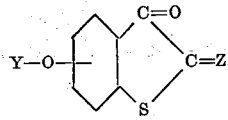

wherein Y represents an aliphatic radical having not more than 4 carbon atoms but at least one OH group, while Z represents the radical of an indigoid-coupling component selected from the group consisting of the isatins, naphthisatins, thionaphthene - quinones, hydroxy - thionaphthenes, pheno-hydroxy-thionaphthenes, acenaphthene-quinones, α-naphthols and α-anthrols.

11. A vat dye compound of the general formula

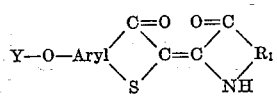

wherein Aryl designates an aryl nucleus having not more than 10 carbon atoms in its cyclic skeleton, Y represents an aliphatic radical having not more than 4 carbon atoms but at least one OH group, while $R_1$ designates an aromatic radical having not more than 10 carbon atoms in its cyclic structure.

12. A thioindigoid vat dye compound of the general formula

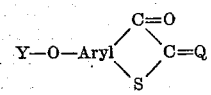

wherein Aryl designates an aryl nucleus having not more than 10 carbon atoms in its cyclic skeleton, Y represents an aliphatic radical having not more than 4 carbon atoms but at least one OH group, while Q stands for the radical of a 3-hydroxy-thionaphthene component.

13. A symmetrical thioindigoid coloring matter of the general formula

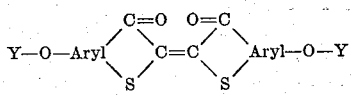

wherein Aryl represents an aryl radical having not more than 10 carbon atoms in its cyclic skeleton, while Y represents an aliphatic radical having not more than 4 carbon atoms but at least one OH group.

14. A symmetrical thioindigoid coloring matter of the general formula

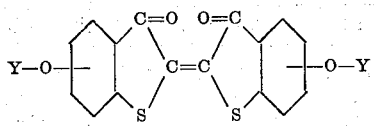

wherein Y represents an aliphatic radical having not more than 4 carbon atoms but at least one OH group.

JOHN ELTON COLE.
BENJAMIN FRANKLIN SKILES.